Figure 1:
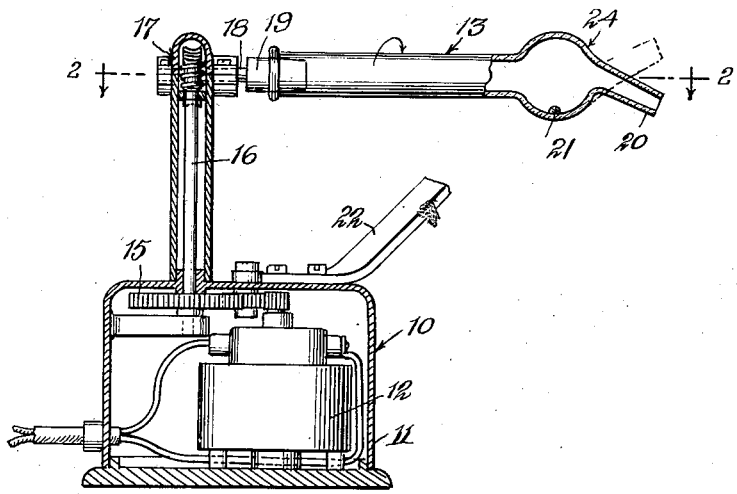

Aug. 9, 1949.     S. SHAPIRO     2,478,785
APPARATUS AND METHOD FOR DETERMINING
COAGULABILITY OF BLOOD
Filed June 14, 1947

INVENTOR.
Shepard Shapiro
BY
Munn, Liddy & Glaccum
Attorneys

Patented Aug. 9, 1949

2,478,785

UNITED STATES PATENT OFFICE 2,478,785

APPARATUS AND METHOD FOR DETERMINING COAGULABILITY OF BLOOD

Shepard Shapiro, New York, N. Y.

Application June 14, 1947, Serial No. 754,630

3 Claims. (Cl. 73—53)

My invention relates to the clotting or coagulation time of blood or other liquid substances, and is designed to provide a method and an apparatus by which such time can be efficiently and accurately measured.

It is well known by the medical profession that the accurate determination of the clotting time of blood is extremely important in diagnosing certain blood and liver diseases. The present known methods are unsatisfactory for many reasons. For example, the clotting time may vary from two to sixteen minutes depending on the system or method being used. Inaccuracies are prevalent in that identical tests have been made on a person's blood within a short space of time with widely different results. Also, the crude technical manipulation of the blood specimen with no definite criteria for fixing the time of clotting has also led to poor results.

It was my purpose to overcome these various disadvantages and furnish the medical profession with an accurate and reliable method for determining the clotting time of a specimen of blood.

One of the many advantages of my method is that the clotting time takes place within a narrow range of several minutes. This enables the medical man to attach important significance to minor deviations in the clotting time which heretofore was impossible.

Another advantage of my method is that it permits the accurate determination of the "end point" which is the actual initial formation of the clot.

A further feature is that in the past the blood specimen has not been agitated uniformly from moment to moment and case to case, which would necessarily furnish results from which it would be difficult to draw an accurate diagnosis.

Another advantage of my method is the procedure followed in transferring the blood specimen from the individual to the testing apparatus which obviates trauma to the formed elements of the blood.

A further advantage is that my method will furnish uniform results from which definite data and charts may be drawn up furnishing the medical man with accurate readings which will result in accurate diagosnis.

Briefly, my method consists in taking a small quantity of unclotted blood and placing it in a smooth, concave container where it will assume the formation of a drop by virtue of its cohesive force. The moment the blood commences to clot, fibrin strands form and these extend out from the original drop in the fashion of pseudopodia and adhere to the surrounding surfaces. The formation of these fibrin strands indicates the initial phase of clotting and they constitute the "end point" which is the most reliable indication of gross blood coagulation.

Further advantages and unique features of my method will be apparent as I proceed with the description.

With reference to the drawings—

Figure 2:
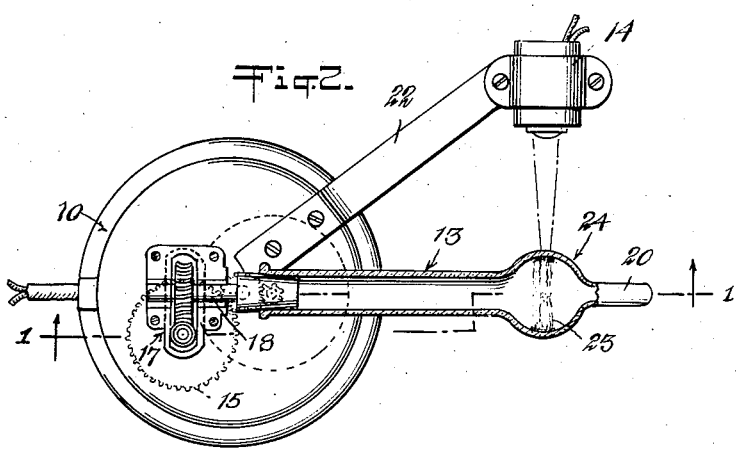

Figure 1 shows a sectional side elevation of my apparatus on line 1—1 of Fig. 2; and Fig. 2 shows a sectional view on line 2—2 of Fig. 1.

In Fig. 1, I show my fibrinometer 10 whose principal parts consist of a base 11, a motor 12, a tubular element 13, and a photo-electric cell 14. The base 11 is hollow and constitutes a housing for the motor 12 and the reduction gear mechanism 15. The gear mechanism 15 is connected through vertical shaft 16 and worm gears 17 to a horizontal shaft 18. Positioned on the end of the shaft 18 is a stopper 19 adapted to fit one end of the tubular element 13. The stopper 19 may be made from cork, rubber or any material that will adequately serve the purpose which is to support the tube 13 in a horizontal axis as it rotates. Additional means may be incorporated if desired to adjust the shaft to rotate vertically or at an angle depending on the substance being tested. The motor 12 and reduction gear 15 may be of any suitable combination to rotate the shaft 18 at variable speeds of 1 to 12 R. P. M. In its preferred form, it is desirable to use a motor. However, any suitable means such as a spring mechanism could be substituted so long as the shaft 18 can rotate at the aforementioned speeds. Supported by the base 11 through an attached arm 22 is a conventional photo-electric cell 14 whose function will be explained later. The transparent tubular element 13 has a bulbous portion 24 at one end equipped with an eccentric opening 20 through which the blood specimen 21 is introduced into the tube. The tube 13 may be made from glass or plastic material and in its preferred form is approximately 11 mm. in diameter, with an internally smooth surface.

To determine the clotting time of a specimen of blood, a sample of blood 21 is obtained by veni puncture or arterial puncture and approximately eight drops or one half of one milliliter is introduced through the opening 20 into the bulbous portion 24 of the tube 13. The transfer of the blood 21 from the vein of a person to the tube 13 must be accomplished smoothly and quickly.

The blood 21 cannot be poured indiscriminately against the surface of the tube without adversely affecting the results of the test. Furthermore, blood which is forced under pressure through a small aperture or is shaken or stirred will clot promptly due to trauma to the formed elements and liberate the coagulating factors in the blood sample. To obviate these possibilities, it is essential that the blood be transferred consistently and gently. At the instant of the veni puncture the keeping of time commences and as soon as the blood has been introduced into the bulbous portion 24, the motor 12 is started causing the tube 13 to rotate at a speed of 1 R. P. M. In its liquid state, a small quantity of unmodified blood by virtue of its cohesive force will remain in the bulbous portion 24 of the tube 13 in the form of a large drop and will attach itself to the surrounding surface. The instant the blood 21 commences to clot, fibrin strands 23 form and because of their adhesiveness cling to the concave wall of the bulbous portion 24 of the tube 13 and start to climb with the rising wall. This appearance of the continuous mass of fibrin strands 23 is the "end point" or initial state of coagulation of the blood and is immediately detectable if the blood is contained in a transparent tube rotating at a slow and constant rate.

In order to promptly detect the initial appearance of the fibrin strands 23, a photo-electric cell 14 may be mounted in such a manner that the strands 23, when they form, will interrupt the beam of light from the cell 14. By having the photo-electric cell 14 working in conjunction with a timing device, and accurate elapsed time reading from the instant the blood is removed from person's vein until the "end point" is reached may be accurately recorded.

In order to line the internal surface of the bulbous portion of the tube to keep the possible friction between the wall and the blood at a minimum, the tube should be cleansed with a saline solution. However, there is no difficulty in distinguishing the fibrin strands 23 from a discoloration on the tube that might be caused by the blood specimen 21.

The blood test may be made at room temperature but if desired a heating element may be positioned above the tube 13 to maintain the blood specimen 21 above or below body temperature. This latter procedure will result in speeding up the clotting time and also enable a more critical diagnosis of the results.

Exhaustive tests have shown that the "end point" makes its appearance in from four to six minutes at room temperature as contrasted with two to sixteen minutes utilizing those procedures now known to the medical profession. Furthermore, in blood dyscrasias, characterized by extended coagulation time, the "end points" are likewise clear, and the results reproducible. Thus we have found the fibrin appearance time to be thirty-five minutes in hemophilla. In thrombocytopenic purpura, the time has been definitely, although only slightly, prolonged during the active bleeding phase of the disease. In the presence of clinical thrombosis in the acute stage, the fibrin appearance time has been found to be normal or reduced.

A method of precisely determining the overall coagulability of unmodified blood by estimation of the time required for the appearance of fibrin has been described. My method enables the registration of small increases in coagulation time, thus permitting a more critical estimation of alteration in blood coagulability. It is applicable to the determination of the maintenance of therapeutic levels of heparin and/or dicumarol. Although it does not eliminate entirely the need for prothrombin time estimations after dicumarol, it may prolong considerably the intervals between essential prothrombin time estimations. The apparatus may also be used to measure the effects of heparin, dicumarol, or other anti-coagulants in both man and animal.

Although I have shown my device in its preferred form utilized to determine the coagulability of blood, it should be realized that the apparatus may be used to reveal changes in the physical state from liquid to semi-solid and/or solid of any substance in which such alterations might be significant. For example, the recognition of of the congealing points of fats, steroids and similar compounds. Also, in making plastic materials the preparations used may require such similar tests.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. An apparatus for determining the coagulability of blood including a transparent tubular element with a bulbous portion at one end, an eccentrically positioned spout projecting from said bulbous portion, a shaft connecting the other end of said tubular element to said reduction gear mechanism, and motor means to drive said shaft through said gear mechanism.

2. An apparatus for determining the coagulability of blood including a transparent tubular element with a bulbous portion at one end, an eccentrically positioned spout projecting from said bulbous portion, a rotary shaft, a plug attached thereto, said tubular element being supported in a horizontal plane by said plug which is adapted to engage the other end of said element, said opening permitting introduction of a blood specimen in said bulbous portion whereby when said tubular element is rotated the clotting time of said blood may be recorded.

3. An apparatus for determining the coagulability of a liquid substance, including a transparent tubular element having a bulbous portion at one end, an eccentrically positioned spout projecting from said bulbous portion, a reduction gearing means connecting the other end of said tubular element to said reduction gear mechanism, and motor means to drive said shaft at variable speeds through said gear mechanism.

SHEPARD SHAPIRO.

REFERENCES CITED

The following references are of record in the file of this patent:

Bard "MacLeod's Physiology in Modern Medicine." The C. V. Mosby Co. (1938) p. 252, lines 1–7.

Todd and Sanford, "Clinical Diagnosis by Lab. Methods," W. B. Saunders Co. (1936), p. 215, Lee and White's Methods.